US010826130B2

(12) United States Patent
Huang

(10) Patent No.: US 10,826,130 B2
(45) Date of Patent: Nov. 3, 2020

(54) NEGATIVE ACTIVE MATERIAL AND PREPARATION METHOD THEREOF AND SECONDARY BATTERY

(71) Applicant: NINGDE AMPEREX TECHNOLOGY LIMITED, Ningde (CN)

(72) Inventor: Qisen Huang, Ningde (CN)

(73) Assignee: NINGDE AMPEREX TECHNOLOGY LIMITED, Ningde, Fujian Province (CN)

( * ) Notice: Subject to any disclaimer, the term of this patent is extended or adjusted under 35 U.S.C. 154(b) by 26 days.

(21) Appl. No.: 15/445,694

(22) Filed: Feb. 28, 2017

(65) Prior Publication Data
US 2017/0271723 A1 Sep. 21, 2017

(30) Foreign Application Priority Data
Mar. 15, 2016 (CN) .......................... 2016 1 0146066

(51) Int. Cl.
*H01M 4/13* (2010.01)
*H01M 10/42* (2006.01)
(Continued)

(52) U.S. Cl.
CPC ........ *H01M 10/4235* (2013.01); *B05D 3/007* (2013.01); *H01M 4/485* (2013.01);
(Continued)

(58) Field of Classification Search
CPC ............. H01M 4/485; H01M 10/4235; H01M 10/052; H01M 10/0525; H01M 2004/027; H01M 2220/30; B05D 3/007
See application file for complete search history.

(56) References Cited

U.S. PATENT DOCUMENTS 9,825,267 B2 * 11/2017 Kim ........................ H01M 2/14
2007/0098879 A1 * 5/2007 Makiura ............. H01L 51/5088
427/66
(Continued)

FOREIGN PATENT DOCUMENTS

CN 101047234 A 10/2007
CN 101790806 A 7/2010
(Continued)

OTHER PUBLICATIONS

Ningde Amperex Technology Limited, Office Action, CN201610146066.0, dated Mar. 11, 2019, 7 pgs.—No Translation Available-.
(Continued)

*Primary Examiner* — Raymond Alejandro
(74) *Attorney, Agent, or Firm* — Morgan, Lewis & Bockius LLP

(57) ABSTRACT

The present application discloses a negative active material and a preparation method thereof and a secondary battery. The negative active material comprises: lithium pre-intercalated silicon-containing materials; and a polymer coating layer coated on an outer surface of each particle of the lithium pre-intercalated silicon-containing materials. The negative active material can improve the first coulombic efficiency of the secondary battery, inhibit the volume expansion of the secondary battery and improve the cycle performance of the secondary battery. The preparation method of the negative electrode plate is simple, environment-friendly, and suitable for mass production.

2 Claims, 3 Drawing Sheets

(51) Int. Cl.
*B05D 3/00* (2006.01)
*H01M 4/485* (2010.01)
*H01M 10/0525* (2010.01)
*H01M 4/02* (2006.01)

(52) U.S. Cl.
CPC .. *H01M 10/0525* (2013.01); *H01M 2004/027* (2013.01); *H01M 2220/30* (2013.01)

(56) References Cited

U.S. PATENT DOCUMENTS

| | | | | |
|---|---|---|---|---|
| 2011/0159370 | A1* | 6/2011 | Inaba | H01M 4/131 429/231.1 |
| 2014/0077128 | A1* | 3/2014 | Inoue | H01M 4/621 252/182.1 |
| 2017/0040599 | A1* | 2/2017 | Kamo | H01M 4/364 |

FOREIGN PATENT DOCUMENTS

| | | | | |
|---|---|---|---|---|
| CN | 102473902 A | 5/2012 | | |
| CN | 103891014 A | 6/2014 | | |
| CN | 103943825 A | 7/2014 | | |
| CN | 104577086 A | 4/2015 | | |
| EP | 0571858 A1 | 12/1993 | | |
| WO | WO 2007/129839 | * | 11/2007 | ............ H01M 10/04 |
| WO | WO-2012015033 A1 | 2/2012 | | |
| WO | WO-2015/107581 A1 | 7/2015 | | |
| WO | WO 2016/136543 | * | 9/2016 | .............. H01M 4/36 |

OTHER PUBLICATIONS

Ningde Amperex Technology Limited, The Second Office Action, CN201610146066.0, dated Aug. 9, 2019, 6 pgs.

* cited by examiner

NEGATIVE ACTIVE MATERIAL AND PREPARATION METHOD THEREOF AND SECONDARY BATTERY

CROSS-REFERENCE TO RELATED APPLICATIONS

The present application claims priority to Chinese Patent Application No. CN201610146066.0, filed on Mar. 15, 2016, which is incorporated herein by reference in its entirety.

FIELD OF THE PRESENT DISCLOSURE

The present disclosure relates to a field of a lithium-ion battery technology, and more specifically relates to a negative active material and a preparation method thereof and a secondary battery.

BACKGROUND OF THE PRESENT DISCLOSURE

With developments of portability and miniaturization of electronic devices, a mass specific capacity of commercialized graphite which is widely used at present has played to its limiting value, due to limitation of intrinsic properties of the commercialized graphite, the commercialized graphite is unable to meet demands on a high energy density of the electronic devices in future. Based on this background, people now look to high lithium storage materials such as silicon-containing materials. A theoretical capacity of pure silicon is 3700 mAh/g, which is about 10 times the theoretical capacity of the graphite (which is about 372 mAh/g), however, a fatal weakness of the pure silicon lies in that a volume expansion rate is up to 300% or more in a lithium deintercalation-intercalation process, which significantly affects stability of the pure silicon and workability of the battery made therefrom, thereby seriously affecting commercialization of the pure silicon. Researchers have found that silicon oxide ($SiO_x$) is the most promising material to be commercialized among various silicon-containing materials after unremitting efforts, a reversible capacity of $SiO_x$ is about 1400 mAh/g. However, due to existence of oxygen, a first coulombic efficiency of $SiO_x$ is relatively low (only about 65%), which greatly restricts its application as the high energy density negative active material.

At the same time, people have found that the volume expansion of the silicon-containing materials substantially occurs in a first charge-discharge cycle, that is, if the silicon-containing materials are processed to allow the volume of the silicon-containing materials to be pre-expanded in advance, the increase of the volume expansion in later cycle processes can be significantly slowed down, which is beneficial to improve cycle performance of the battery. For example, International Patent application publication No. WO2012/015033A1 published on Feb. 2, 2012 discloses a lithium pre-treatment technology, which can reduce or eliminate the irreversible capacity of the silicon alloy negative active material. However, in this technology, lithium is deposited on the surface of the negative electrode plate by means of directly adding a lithium metal foil on the surface of the negative electrode plate or by means of directly evaporation plating lithium metal on the surface of the negative electrode plate, which easily makes the pre-treated negative electrode plate contact air and water so as to cause fire, and there is a great potential safety hazard. At the same time, because this technology is performed on the processing in electrode plate level, this technology cannot fundamentally prevent the silicon-containing materials from affecting performances of the battery during the volume expansion of the silicon-containing materials in the first charge-discharge cycle.

SUMMARY OF THE PRESENT DISCLOSURE

In view of the problems existing in the background technology, an object of the present disclosure is to provide a negative active material and a preparation method thereof and a secondary battery, the negative active material can improve first coulombic efficiency of the secondary battery, inhibit volume expansion of the secondary battery and improve cycle performance of the secondary battery.

In order to achieve the above object, in a first aspect of the present disclosure, the present disclosure provides a negative active material, which comprises: lithium pre-intercalated silicon-containing materials; and a polymer coating layer coated on an outer surface of each particle of the lithium pre-intercalated silicon-containing materials.

In a second aspect of the present disclosure, the present disclosure provides a preparation method of a negative active material, used to prepare the negative active material according to the first aspect of the present disclosure, and comprises steps of: (1) in a reactor, adding silicon-containing materials into a first organic solvent to disperse to obtain a slurry, then transferring the reactor containing the slurry into a closed vessel; (2) adding lithium powders into the slurry, stirring to make the lithium powders and the silicon-containing materials in the slurry uniformly mixed and contact with each other, then taking the slurry out of the reactor so as to remove the first organic solvent to obtain a precursor of lithium pre-intercalated silicon-containing materials; (3) mixing a polymer and a second organic solvent to obtain a polymer solution, positioning the precursor of the lithium pre-intercalated silicon-containing materials and the polymer solution into the reactor, mixing, stirring and heating to completely evaporate the second organic solvent and the possibly residual first organic solvent and allow the polymer solution to form a polymer coating layer coated on an outer surface of each particle of the lithium pre-intercalated silicon-containing materials after the second organic solvent in the polymer solution is completely evaporated, so as to complete the preparation of the negative active material.

In a third aspect of the present disclosure, the present disclosure provides a secondary battery, which comprises the negative active material according to the first aspect of the present disclosure.

The present disclosure has following beneficial effects:

The preparation method of the negative electrode plate of the present disclosure is simple, environment-friendly, and suitable for mass production.

The secondary battery made from the negative active material of the present disclosure has a high first coulombic efficiency, an excellent cycle performance and a smaller volume expansion, which is particularly suitable for use in consumer electronic products.

DETAILED DESCRIPTION

Figure 1:
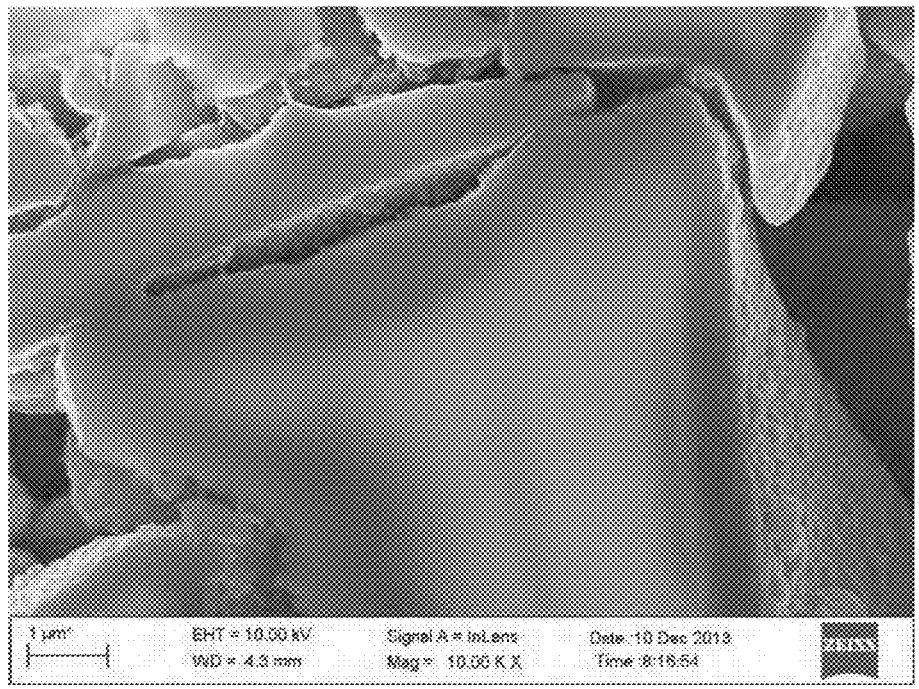
FIG. 1 was a section SEM image of a negative active material prepared in example 1.
Figure 2:
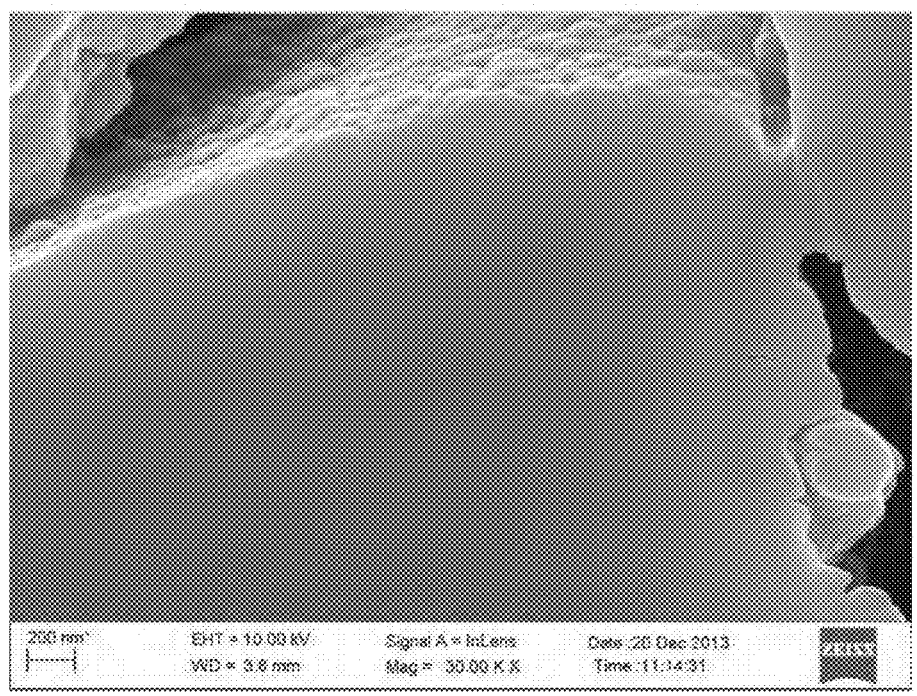
FIG. 2 was a section SEM image of a negative active material prepared in example 2.
Figure 3:
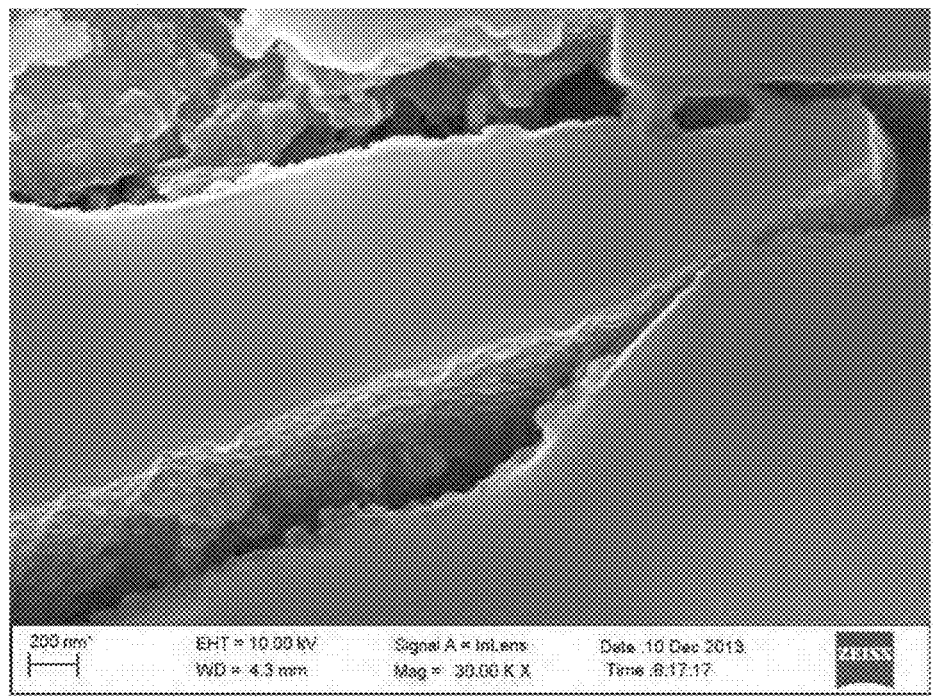
FIG. 3 was a section SEM image of a negative active material prepared in example 3.
Figure 4:
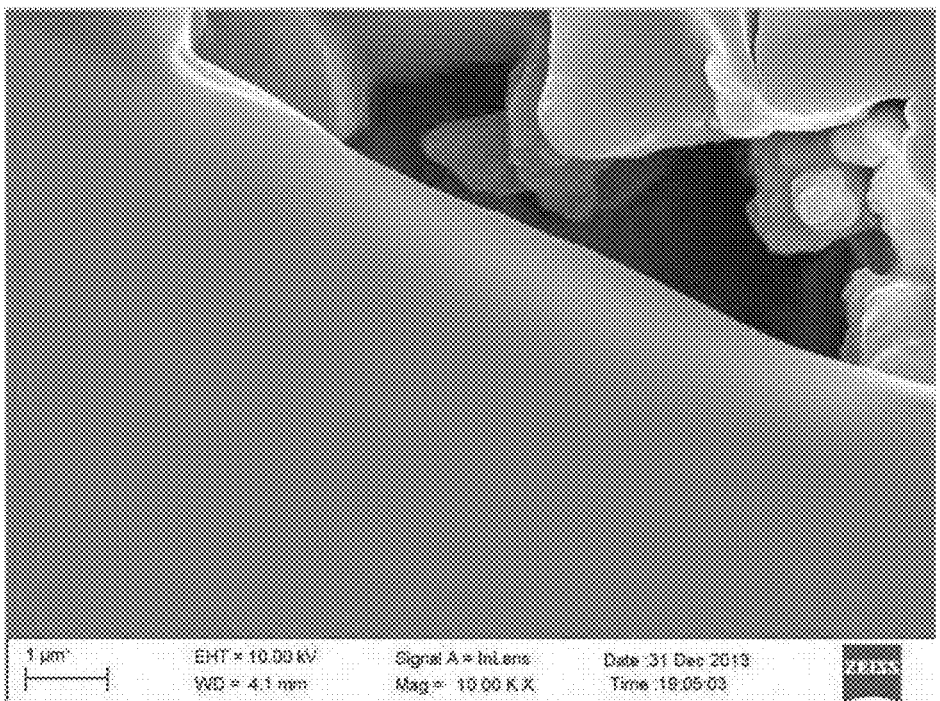
FIG. 4 was a section SEM image of a negative active material prepared in example 4.

Hereinafter a negative active material and a preparation method thereof and a secondary battery according to the present disclosure are described in detail.

Firstly, a negative active material according to a first aspect of the present disclosure is described, which comprises: lithium pre-intercalated silicon-containing materials; and a polymer coating layer coated on an outer surface of each particle of the lithium pre-intercalated silicon-containing materials.

In the negative active material according to the first aspect of the present disclosure, unlike WO2012/015033A1, the lithium pre-intercalation process is performed on the silicon-containing materials in powder level in the present disclosure, therefore the present disclosure can fundamentally solve the problem that the battery has a low first coulombic efficiency, in addition, the silicon-containing materials have expanded in the lithium pre-intercalation process, which can significantly alleviate the volume expansion of the silicon-containing materials (or the negative active material) in electrode plate level, and significantly improve the cycle performance of the battery. However, although the silicon-containing materials have been processed in the lithium pre-intercalation process to form a Li—Si alloy, the formed Li—Si alloy is still extremely active in conventional environment, and is particularly active in the air, therefore safety accident easily occurs (for example, the pre-intercalated lithium in the Li—Si alloy contacts the air and the water so as to cause fire and the like). And in a conventional preparation method of the lithium-ion secondary battery, the negative active material, a solvent (usually deionized water), a binder and a conductive material and the like are mixed together to form a slurry. If the used negative active material itself is not stable, the preparation of the lithium-ion secondary battery cannot be performed. Therefore the prepared lithium pre-intercalated silicon-containing materials need performing surface modification so as to make the lithium pre-intercalated silicon-containing materials not only stable in the conventional environment, but also meet the requirements in the preparation of the lithium-ion secondary battery. The above problem can be solved by coating a polymer coating layer onto the outer surface of each particle of the lithium pre-intercalated silicon-containing materials, the polymer coating layer can prevent each particle of the lithium pre-intercalated silicon-containing materials from contacting the air and the water, so as to make each particle of the lithium pre-intercalated silicon-containing materials not only stable in the conventional environment but also meet the requirements in the preparation of the conventional lithium-ion secondary battery without additional cost and potential safety hazard.

In the negative active material according to the first aspect of the present disclosure, the lithium pre-intercalated silicon-containing materials are obtained by mixing silicon-containing materials and lithium powders, the silicon-containing materials and the lithium powders are reacted so that the lithium elements are intercalated into voids in each particle of the silicon-containing materials so as to make each particle of the lithium pre-intercalated silicon-containing materials have an amorphous configuration, and the lithium element in the lithium pre-intercalated silicon-containing materials can be fully deintercalated.

In the negative active material according to the first aspect of the present disclosure, a lithium intercalation amount of the silicon-containing materials makes a theoretical capacity of the lithium pre-intercalated silicon-containing materials be no more than 60% of a theoretical capacity of the silicon-containing materials. The lithium pre-intercalation process is performed on each particle of the silicon-containing materials from the outer surface to the interior, the lithium powders are mainly diffused into each particle of the silicon-containing materials in this process, which means that the process can only be performed under a certain concentration difference or a certain potential difference. Although in theory, so long as the lithium source (the lithium powders) is sufficient, the theoretical capacity of the lithium pre-intercalated silicon-containing materials can be 100% of the theoretical capacity of the silicon-containing materials, however, the diffusion process is quite slow. This is because in the later stage of the lithium pre-intercalation process, on one hand, the lithium concentration difference between the interior and the outer surface of each particle of the silicon-containing materials is gradually smaller, therefore driving force is gradually reduced; and on the other hand, an amount of the pre-intercalated lithium on the surface of each particle of the silicon-containing materials increases, a potential of the pre-intercalated lithium on the outer surface of each particle of the silicon-containing materials is gradually close to a potential of the lithium source (the lithium powders), the driving force is also gradually reduced, therefore whole diffusion rate is significantly decreased and it is not beneficial to improve productive efficiency. In addition, for safety reasons, the amount of the pre-intercalated lithium is higher, the activity of each particle of the obtained lithium pre-intercalated silicon-containing materials is higher, and challenge on the preparation of the secondary battery is bigger.

In the negative active material according to the first aspect of the present disclosure, a silicon-containing material of the lithium pre-intercalated silicon-containing material may be oxide of silicon, that is $SiO_x$, x=0.9~1.1, the reversible capacity of the oxide of silicon is up to 1400 mAh/g, and the volume expansion of the oxide of silicon is only one third of the volume expansion of the pure silicon, and the cycle performance of the oxide of silicon is the best in existing silicon-containing materials.

In the negative active material according to the first aspect of the present disclosure, a polymer in the polymer coating layer may be one or more selected from a group consisting of polyamide, polyamide-imide, polyimide and polysiloxane. The used polymer is a non-aqueous polymer, this is because the activity of the lithium pre-intercalated silicon-containing materials is still higher, if the lithium pre-intercalated silicon-containing materials contact the water, the lithium pre-intercalated silicon-containing materials and the water react violently even cause fire, which results in a potential safety hazard. Therefore if it is desired to coat a polymer layer on the outer surface of each particle of the lithium pre-intercalated silicon-containing materials, a non-aqueous polymer should be used instead of a water soluble polymer. In addition, the used polymer should further have ionic conductivity, or the used polymer should have ionic conductivity after the lithium source and the used polymer are reacted (that is the lithium elements are intercalated in the used polymer); and the used polymer should also have a certain strength and a certain elasticity, so that when each particle of the lithium pre-intercalated silicon-containing materials expands or contracts in volume during the cycle process, the used polymer can still maintain structural integrity of the polymer coating layer. Therefore the polymer coating layer is not only a stable artificial SEI membrane, which can prevent each particle of the lithium pre-intercalated silicon-containing materials from directly contacting electrolyte, so as to significantly reduce by-products, but also can further maintain the structural integrity of each particle of the lithium pre-intercalated silicon-containing materials without reducing electronic conductivity of each particle of the lithium pre-intercalated silicon-containing materials, thereby efficiently improving the cycle performance of the secondary battery.

In the negative active material according to the first aspect of the present disclosure, the polysiloxane may be polydimethylsiloxane.

In the negative active material according to the first aspect of the present disclosure, a thickness of the polymer coating layer may be 20 nm~500 nm. The thickness of the polymer coating layer should be no less than 20 nm, therefore each particle of the lithium pre-intercalated silicon-containing materials can be fully coated with the polymer coating layer, the stability of each particle of the lithium pre-intercalated silicon-containing materials is ensured, so that the lithium pre-intercalated silicon-containing materials can be stored in the conventional environment, and the requirements in the preparation of the conventional lithium-ion secondary battery can also be met. The thickness of the polymer coating layer should be no more than 500 nm, this is because when the thickness of the polymer coating layer increases, although the stability of each particle of the lithium pre-intercalated silicon-containing materials is further ensured, however, as the thickness of the polymer coating layer increases, the capacity of the secondary battery decreases. Furthermore, the ionic conductivity and the electronic conductivity of the polymer are limited, if the coated polymer coating layer is too thick, dynamic performance of the secondary battery will be affected. Moreover, there is a higher challenge on the coating technology to coat a too thick polymer coating layer on each particle of the lithium pre-intercalated silicon-containing materials, for example, particle aggregation of the negative active materials easily occurs, which will bring negative effects on product yield of the secondary battery, the preparation of the secondary battery and the electrochemical performance of the secondary battery.

Next a preparation method of a negative active material according to a second aspect of the present disclosure is described, is used to prepare the negative active material according to the first aspect of the present disclosure, and comprises steps of: (1) in a reactor, adding silicon-containing materials into a first organic solvent to disperse to obtain a slurry, then transferring the reactor containing the slurry into a closed vessel; (2) adding lithium powders into the slurry, stirring to make the lithium powders and the silicon-containing materials in the slurry uniformly mixed and contact with each other, then taking the slurry out of the reactor so as to remove the first organic solvent to obtain a precursor of lithium pre-intercalated silicon-containing materials; (3) mixing a polymer and a second organic solvent to obtain a polymer solution, positioning the precursor of the lithium pre-intercalated silicon-containing materials and the polymer solution into the reactor, mixing, stirring and heating to completely evaporate the second organic solvent and the possibly residual first organic solvent and allow the polymer solution to form a polymer coating layer coated on each particle of the lithium pre-intercalated silicon-containing materials after the second organic solvent in the polymer solution is completely evaporated, so as to complete the preparation of the negative active material.

In the preparation method of the negative active material according to the second aspect of the present disclosure, the closed vessel may be protected by noble gases or the closed vessel may be in vacuum. Both the activity of the lithium powders and the activity of the lithium pre-intercalated silicon-containing materials are active, the lithium powders and the lithium pre-intercalated silicon-containing materials easily react with the water in the air, particularly in the moist atmosphere, to generate a large amount of hydrogen, if the lithium powders and the lithium pre-intercalated silicon-containing materials further react with oxygen, a great potential safety hazard will occur, and the potential safety hazard may be eliminated when the closed vessel is protected by noble gases or vacuum.

In the preparation method of the negative active material according to the second aspect of the present disclosure, in step (1), the first organic solvent may be one or more selected from a group consisting of silicone oil, n-hexane and ether. This is because the strong antioxidant organic solvent can be avoided from reacting with the lithium powders or the lithium pre-intercalated silicon-containing materials, so that the whole preparation process of the preparation method of the negative active material according to the second aspect of the present disclosure is performed in a stable system.

In the preparation method of the negative active material according to the second aspect of the present disclosure, in step (2) and step (3), a speed of the stirring is no less than 1000 r/min. In the two steps, it is required that stirring is ceaselessly performed and the speed of the stirring should be no less than 1000 r/min, which not only makes the reaction homogeneous so as to avoid local overheating, but also makes the materials which will react with each other fully contact with each other so as to accelerate the reaction process.

In the preparation method of the negative active material according to the second aspect of the present disclosure, in step (2), a cooling treatment is performed on the closed vessel, this is based on an exothermic consideration so as to prevent thermal runaway occurring in the reaction system. Preferably, the cooling treatment is a water-cooling treatment.

In the preparation method of the negative active material according to the second aspect of the present disclosure, in step (3), the heating temperature is no more than 150° C. That is the temperature at which the organic solvent is evaporated to dryness is no more than 150° C. This is because the organic solvent (comprising the second organic solvent and the possibly residual first organic solvent) is needed to evaporate to dryness in order to obtain the final materials in powder level, however, in consideration of the activity of the lithium pre-intercalated silicon-containing materials, the heating temperature should be strictly controlled. If the heating temperature is too high, it not only causes an unnecessary energy consumption waste, but also makes the polymer coating layer not dense because the evaporation of the organic solvent is too fast, thereby making the obtained final materials in powder level not stable in the conventional environment.

In the preparation method of the negative active material according to the second aspect of the present disclosure, in step (3), the second organic solvent may be one or more selected from a group consisting of 1-Methyl-2-pyrrolidinone (NMP), silicone oil, n-hexane and ether.

In the preparation method of the negative active material according to the second aspect of the present disclosure, the first organic solvent and the second organic solvent may be same or different.

Next a secondary battery according to a third aspect of the present disclosure is described, and comprises the negative active material according to the first aspect of the present disclosure.

In the secondary battery according to the third aspect of the present disclosure, the secondary battery may be a lithium-ion secondary battery.

Hereafter in order to make the objects, the technology solutions and the beneficial technical effects more clearly, the present disclosure will be described in detail in combination with the accompanying figures and the embodiments. It should be noted that, the examples described in the present disclosure are only used for explaining the present disclosure, and are not intended to limit the present disclosure.

Example 1

In a reactor, $SiO_x$ powders were added into silicone oil (first organic solvent) to obtain an uniform slurry under full stirring with a high-speed dispersing machine, then the reactor containing the slurry was transferred into a closed vessel. Noble gas was filled into the closed vessel to ejected out air and maintain a chamber of the closed vessel to be under a positive pressure, so as to ensure that air was as little as possible in the chamber of the closed vessel. A stirrer of the reactor was turned on with a speed of the stirring of 1000 r/min to make the slurry being in a dispersed state, then lithium powders were slowly added into the slurry so as to make the lithium powders and $SiO_x$ powders be uniformly mixed and contact with each other. Because this process was an exothermic process, an uninterrupted water-cooling treatment was performed on the closed vessel. Addition of the lithium powders was stopped when an added amount of the lithium powders made a theoretical capacity of the lithium pre-intercalated $SiO_x$ be 60% of a theoretical capacity of $SiO_x$, and stirring was maintained until the added lithium powders completely disappeared. Then the slurry was taken out of the reactor, cleaned, filtered and the like so as to remove the silicone oil to obtain a precursor of the lithium pre-intercalated $SiO_x$.

The obtained precursor of the lithium pre-intercalated $SiO_x$ and a mixed solution comprising polydimethylsiloxane and n-hexane (second organic solvent) were positioned in the reactor to be uniformly mixed under ceaseless stirring with the stirrer of the reactor at a speed of the stirring of 1000 r/min, and a heat treatment was performed on the reactor at the same time with a heating temperature of 140° C. until the n-hexane and the possibly residual silicone oil were completely evaporated, the lithium pre-intercalated $SiO_x$ coated with a polydimethylsiloxane coating layer was obtained, the preparation of the negative active material was completed, and a thickness of the polydimethylsiloxane coating layer was about 500 nm.

Example 2

In a reactor, $SiO_x$ powders were added into ether (first organic solvent) to obtain an uniform slurry under full stirring with a high-speed dispersing machine, then the reactor containing the slurry was transferred into a closed vessel. Vacuum-pumping was repeatedly performed on the closed vessel so as to ensure that air was as little as possible in the chamber of the closed vessel. A stirrer of the reactor was turned on with a speed of the stirring of 1200 r/min to make the slurry being in a dispersed state, then lithium powders were slowly added into the slurry so as to make the lithium powders and $SiO_x$ powders be uniformly mixed and contact with each other. Because this process was an exothermic process, an uninterrupted water-cooling treatment was performed on the closed vessel. Addition of the lithium powders was stopped when an added amount of the lithium powders made a theoretical capacity of the lithium pre-intercalated $SiO_x$ be 50% of a theoretical capacity of $SiO_x$, and stirring was maintained until the added lithium powders completely disappeared. Then the slurry was taken out of the reactor, cleaned, filtered and the like so as to remove the ether to obtain a precursor of the lithium pre-intercalated $SiO_x$.

The obtained precursor of the lithium pre-intercalated $SiO_x$ and a mixed solution comprising polyamide and 1-methyl-2-pyrrolidinone (NMP, second organic solvent) were positioned in the reactor to be uniformly mixed under ceaseless stirring with the stirrer of the reactor at a speed of the stirring of 1200 r/min, and a heat treatment was performed on the reactor at the same time with a heating temperature of 120° C. until NMP and the possibly residual ether were completely evaporated, the lithium pre-intercalated $SiO_x$ coated with a polyamide coating layer was obtained, the preparation of the negative active material was completed, and a thickness of the polyamide coating layer was about 100 nm.

Example 3

In a reactor, $SiO_x$ powders were added into n-hexane (first organic solvent) to obtain an uniform slurry under full stirring with a high-speed dispersing machine, then the reactor containing the slurry was transferred into a closed vessel. Vacuum-pumping was repeatedly performed on the closed vessel to so as to ensure that air was as little as possible in the chamber of the closed vessel. A stirrer of the reactor was turned on with a speed of the stirring of 1200 r/min to make the slurry being in a dispersed state, then lithium powders were slowly added into the slurry so as to make the lithium powders and $SiO_x$ powders be uniformly mixed and contact with each other. Because this process was an exothermic process, an uninterrupted water-cooling treatment was performed on the closed vessel. Addition of the lithium powders was stopped when an added amount of the lithium powders made a theoretical capacity of the lithium pre-intercalated $SiO_x$ be 40% of a theoretical capacity of $SiO_x$, and stirring was maintained until the added lithium powders completely disappeared. Then the slurry was taken out of the reactor, cleaned, filtered and the like so as to remove the n-hexane to obtain a precursor of the lithium pre-intercalated $SiO_x$.

The obtained precursor of the lithium pre-intercalated $SiO_x$ and a mixed solution comprising polyamide-imide and NMP (second organic solvent) were positioned in the reactor to be uniformly mixed under ceaseless stirring with the stirrer of the reactor at a speed of the stirring of 1200 r/min, and a heat treatment was performed on the reactor at the same time with a heating temperature of 120° C. until NMP and the possibly residual n-hexane were completely evaporated, the lithium pre-intercalated $SiO_x$ coated with a polyamide-imide coating layer was obtained, the preparation of the negative active material was completed, and a thickness of the polyamide-imide coating layer was about 50 nm.

Example 4

In a reactor, $SiO_x$ powders were added into n-hexane (first organic solvent) to obtain an uniform slurry under full stirring with a high-speed dispersing machine, then the reactor containing the slurry was transferred into a closed vessel. Vacuum-pumping was repeatedly performed on the closed vessel so as to ensure that air was as little as possible in the chamber of the closed vessel. A stirrer of the reactor was turned on with a speed of the stirring of 1200 r/min to make the slurry being in a dispersed state, then lithium powders were slowly added into the slurry so as to make the lithium powders and $SiO_x$ powders be uniformly mixed and contact with each other. Because this process was an exothermic process, an uninterrupted water-cooling treatment was performed on the closed vessel.

Addition of the lithium powders was stopped when an added amount of the lithium powders made a theoretical capacity of the lithium pre-intercalated $SiO_x$ be 30% of a theoretical capacity of $SiO_x$ and stirring was maintained until the added lithium powders were completely disappeared. Then the slurry was taken out of the reactor, cleaned, filtered and the like so as to remove the n-hexane to obtain a precursor of the lithium pre-intercalated $SiO_x$.

The obtained precursor of the lithium pre-intercalated $SiO_x$ and a mixed solution comprising polyimide and NMP (second organic solvent) were positioned in the reactor to be uniformly mixed under ceaseless stirring with the stirrer of the reactor at a speed of the stirring of 1200 r/min, and a heat treatment was performed on the reactor at the same time with a heating temperature of 120° C. until NMP and the possibly residual n-hexane were completely evaporated, the lithium pre-intercalated $SiO_x$ coated with a polyimide coating layer was obtained, the preparation of the negative active material was completed, and a thickness of the polyimide coating layer was about 20 nm.

Comparative Example 1

$SiO_x$ was directly used as the negative active material without a lithium pre-intercalation process and a polymer coating process.

Each negative active material of the negative active materials respectively prepared in examples 1-4 and comparative example 1 and SBR (binder), CMC (thickening agent) and conductive carbon black (conductive material) according to a mass ratio of 97:1:1:1 were uniformly mixed with deionized water (solvent) to form a negative electrode slurry, then the negative electrode slurry was uniformly coated on a current collector, which was followed by cold pressing, cutting and the like, and finally a negative electrode plate was obtained, and the coated negative electrode slurry on the current collector was changed into a negative electrode film. $LiCoO_2$ (positive active material), conductive carbon black (conductive material), polyvinylidene difluoride (PVDF, binder) according to a mass ratio of 97:1.4:1.6 were uniformly mixed with NMP (solvent) to form a positive electrode slurry, then the positive electrode slurry was uniformly coated on a current collector, which was followed by cold pressing, cutting and the like, and finally a positive electrode plate was obtained. Then the positive electrode plate, the negative electrode plate and a separator (PP membrane) were wound together to form a cell, which was followed by injecting the electrolyte and formation and the like, and finally a lithium-ion secondary battery was completed. Numbers of the lithium-ion secondary batteries in examples 1-4 and comparative example 1 were respectively marked as S1, S2, S3, S4 and W1.

Next testing processes would be described.

Five lithium-ion secondary batteries taken in each of examples 1-4 and comparative example 1 were tested, at room temperature, each lithium-ion secondary battery was charged to 4.35 V at a constant current of 1 C, then the lithium-ion secondary battery was charged to 0.05 C at a constant voltage of 4.35 V, standing by 0.5 h to obtain a first cycle charging capacity; then the lithium-ion secondary battery was discharged to 3.0 V at a constant current of 1 C, standing by 0.5 h to obtain a first cycle discharging capacity. The above process was a charge-discharge cycle, then the charge-discharge cycle was repeated.

First coulombic efficiency of the lithium-ion secondary battery=(first cycle discharging capacity/first cycle charging capacity)×100%.

An initial thickness of the prepared negative electrode plate was marked as $H_0$. The lithium-ion secondary battery was repeated for N cycles and then the lithium-ion secondary battery was full charged, then the lithium-ion secondary battery was disassembled to obtain a thickness of the negative electrode plate which was marked as $H_N$. Thickness expansion rate of the negative electrode plate after N cycles =$(H_N/H_0)\times100\%$-1. $H_N$ represented the thickness of the negative electrode plate after N cycles, $H_0$ represented the initial thickness of the prepared negative electrode plate.

TABLE 1

Test results of first coulombic efficiency and expansion rate of the negative electrode plate of the lithium-ion secondary battery

| | First coulombic efficiency (%) | Thickness expansion rate of the negative electrode plate after N cycles (%) | | | | |
|---|---|---|---|---|---|---|
| | | 1 cycle | 100 cycle | 200 cycle | 300 cycle | 400 cycle |
| S1 | 93 | 20 | 23 | 26 | 35 | 43 |
| S2 | 90 | 40 | 45 | 55 | 67 | 73 |
| S3 | 85 | 55 | 59 | 67 | 76 | 83 |
| S4 | 80 | 70 | 74 | 82 | 93 | diving |
| W1 | 65 | 100 | 140 | diving | — | — |

Figure 5:
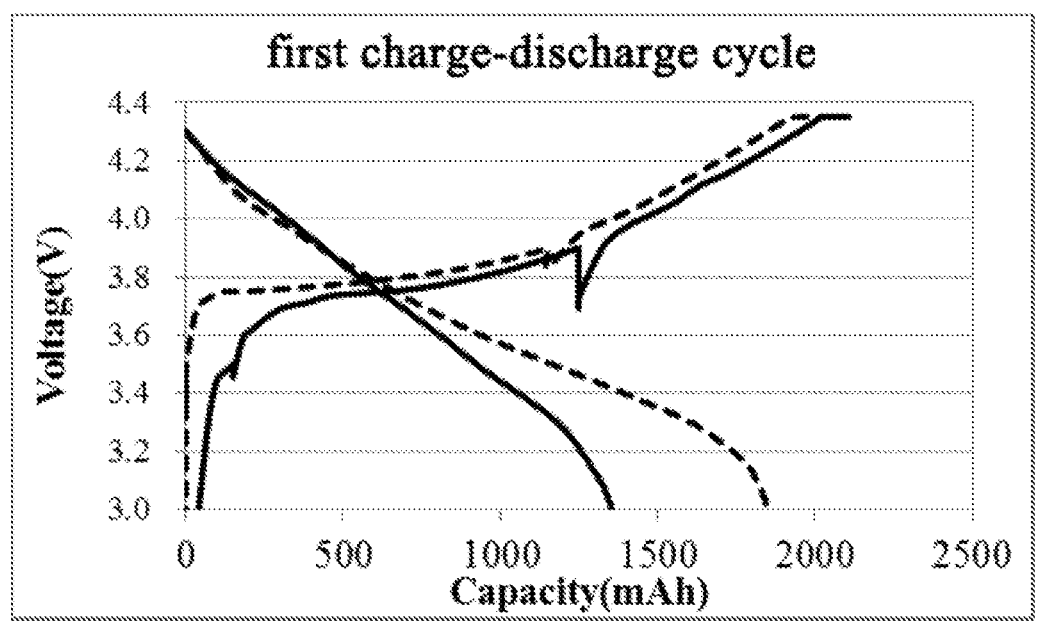
FIG. 5 illustrated curves in the first charge-discharge cycle process of example 1 and comparative example 1, a real line in FIG. 5 represented comparative example 1, a broken line in FIG. 5 represented example 1.

It could be seen from Table 1, the first coulombic efficiency and the thickness expansion rate of the negative electrode plate of the lithium-ion secondary batteries (S1, S2, S3, S4) using the negative active materials of the present disclosure were far superior to that of the lithium-ion secondary battery (W1) using $SiO_x$ particle without the lithium pre-intercalation process and the polymer coating process. Referring to FIG. 1 through FIG. 4, in the negative active material of the present disclosure, the outer surface of each particle of the lithium pre-intercalated silicon-containing materials was coated with a dense polymer coating layer. Referring to FIG. 5, a real line represented the first charge-discharge cycle curve of comparative example 1, a broken line represented the first charge-discharge cycle curve of example 1, and example 1 had a higher discharge capacity after the first charge-discharge cycle. This was because in the present disclosure, $SiO_x$ particle was partially pre-intercalated, and the outer surface of $SiO_x$ particle was further coated with the polymer coating layer. The required lithium to be consumed in the irreversible process has been added in the lithium pre-intercalation process, and the polymer coating layer coated on the outer surface of each particle of the lithium pre-intercalated silicon-containing materials was equivalent to an artificial SEI membrane, which also reduced the lithium to be consumed during the formation of the SEI membrane, therefore the first coulombic efficiencies of the lithium-ion secondary batteries (S1, S2, S3, S4) were improved to varying degrees. In addition, the lithium pre-intercalated $SiO_x$ particle had already partially expanded, therefore the thickness expansion rate of the negative electrode plate in the later cycle process was relatively small. The lithium intercalation amount of $SiO_x$ particle was bigger, that is the pre-expansion of $SiO_x$ particle was bigger, the thickness expansion rate of the negative electrode plate in the later cycle process was smaller, which meant that damage to the SEI membrane in the later cycle process was reduced, therefore the cycle performance of the lithium-ion secondary battery was extended.

According to the foregoing descriptions and teachings of the present disclosure, a person skilled in the art may also make appropriate variations and modifications to the above embodiments. Therefore, the present disclosure is not limited to the specific embodiments disclosed and described in the above, modifications and variations of the present disclosure will also be fallen within the scope of the appended claims of the present disclosure. Furthermore, although specific terminologies are used in the present disclosure, these terminologies are merely for convenience of description, and are not intended to limit the present disclosure.

What is claimed is:

1. A secondary battery comprising a negative electrode plate, the negative electrode plate comprising a negative active material and a binder, the negative active material comprising:
   lithium pre-intercalated silicon-containing materials; and
   a polymer coating layer fully coated on an entire outer surface of each particle of the lithium pre-intercalated silicon-containing materials, a polymer in the polymer coating layer being one or more selected from a group consisting of polyamide and polyamide-imide;
   a thickness of the polymer coating layer being 20 nm~500 nm;
   a material of the binder being different from the polymer in the polymer coating layer;
   wherein,
   a silicon-containing material of the lithium pre-intercalated silicon-containing materials is oxide of silicon;
   a lithium intercalation amount of the silicon-containing material makes a theoretical charge capacity of the lithium pre-intercalated silicon-containing materials be no more than 60% of a theoretical charge capacity of the silicon-containing materials; and
   a thickness expansion rate of the negative electrode plate of the secondary battery after 100 cycles is less than or equal to 45%.

2. The secondary battery according to claim 1, wherein the lithium pre-intercalated silicon-containing materials are obtained by mixing silicon-containing materials and lithium powders.

* * * * *